Dec. 22, 1925.

H. I. SCHARR 1,566,975

ELECTRICAL FITTING

Filed July 17, 1924

Inventor
Harry I. Scharr,
By William C. Linton.
Attorney

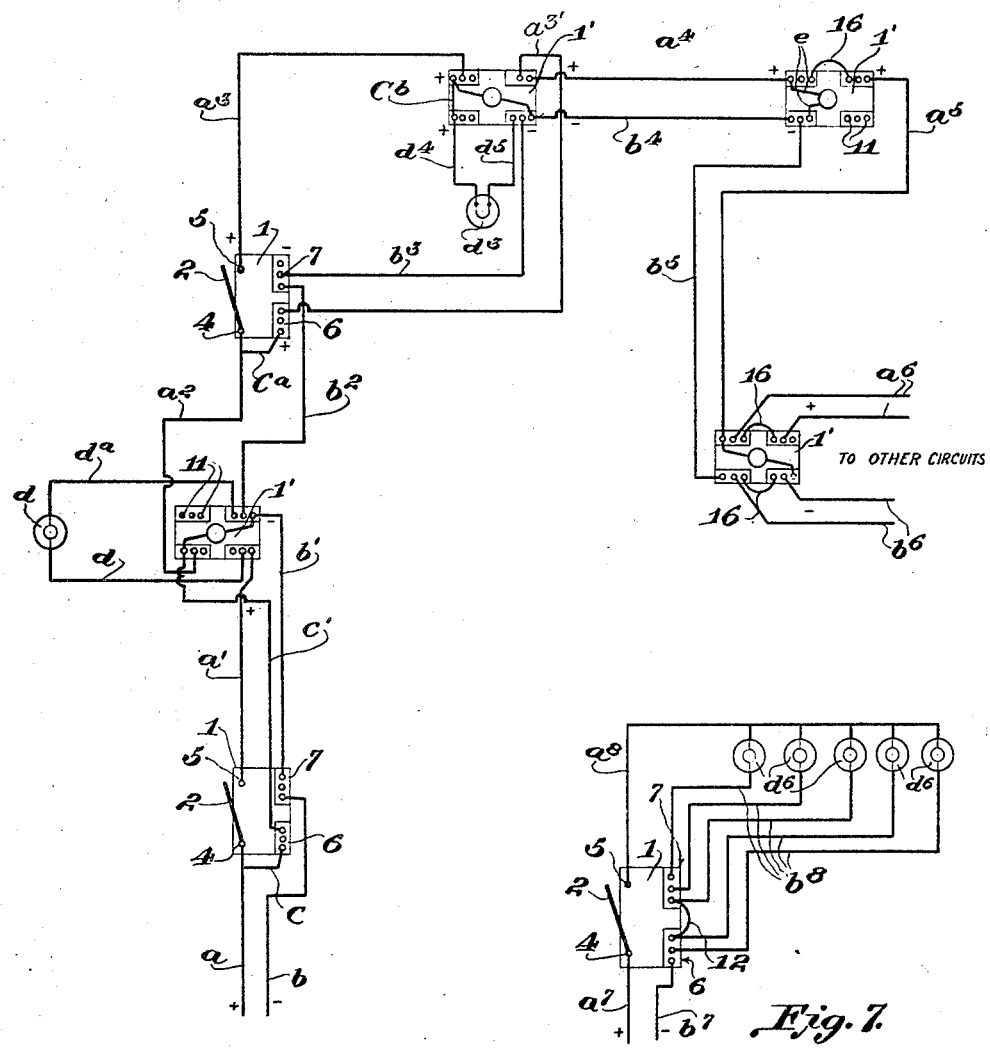

Patented Dec. 22, 1925.

1,566,975

UNITED STATES PATENT OFFICE.

HARRY I. SCHARR, OF WASHINGTON, DISTRICT OF COLUMBIA.

ELECTRICAL FITTING.

Application filed July 17, 1924. Serial No. 726,616.

*To all whom it may concern:*

Be it known that I, HARRY I. SCHARR, a citizen of the United States of America, residing at Washington, in the District of Columbia, have invented certain new and useful Improvements in Electrical Fittings; and I do hereby declare that the following is a full, clear, concise, and exact description of the invention, such as will enable others skilled in the art to which it appertains to make and use the same.

This invention relates to improvements in electrical fittings or appliances, and has for an object to provide a novel form of electrical conductor junction or connecting device, especially advantageous for use in the "wiring" of buildings, whereby a multiplicity of branch lines or circuits may be electrically and independently connected to a main line or source of supply without the necessity of splicing, soldering or taping such joints or connections, hence, effecting a considerable saving of time and labor upon part of a user as well as the costs associated therewith.

It is likewise an object of the invention to provide a device of the character mentioned which may be used in connection with an electrical switch or with the usual wall or floor plug connection and used as a distributor, such adaption of the invention permitting the same to receive and distribute energy coming from a common main line or circuit to its particular circuit as well as the electrical junction of independent branch lines or circuits thereto.

Other objects of the invention will be in part obvious and in part pointed out hereinafter.

In order that the invention and its mode of operation may be readily understood by persons skilled in the art, I have in the accompanying illustrative drawings, and in the detailed following description based thereupon, set out several possible embodiments of the same.

In these drawings:—

Figure 6 is a schematic view showing a main circuit equipped with the several forms of my invention; and, Figure 7 is a schematic view of a slightly modified form or adaption of that form of the device as shown in the Figures 1 and 2.

Figure 1:
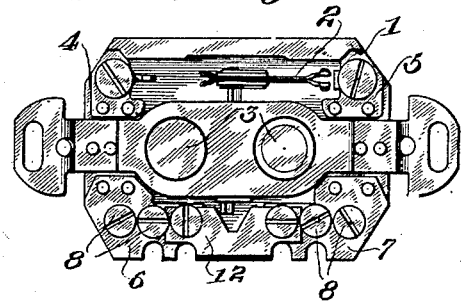
Figure 1 is a top view of the invention used in connection with a single pole electrical switch.
Figure 3:
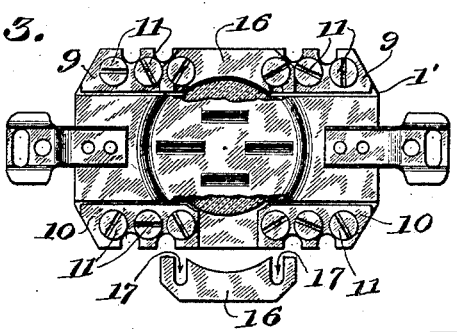
Figure 3 is a top view of the invention having a portion thereof broken away and shown in section showing the device used in connection with an electrical wall plug.

Having more particular reference to the drawings, in connection with which like characters of reference will designate corresponding parts throughout, I have shown for purposes of illustration herein, my improved junction device as being used in connection with an electrical switch and an electrical wall plug (Figures 1 and 3). At this point, it is to be understood, however, that the device is not limited in its range of adaption those particular embodiments shown in the accompanying drawings, but to the contrary, it may be modified in its arrangement and applied to various other electrical appliances, such for example, as distributors, junction boxes and like devices such as conditions or preference may dictate. The invention may be practically used solely as a junction or connecting device, should it be so desired.

Figure 2:
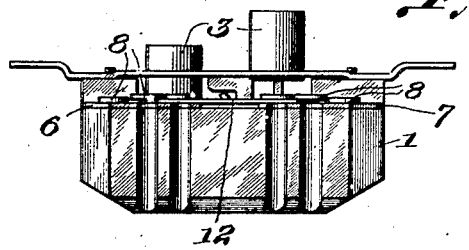
Figure 2 is a side elevation of the same.

In the Figures 1 and 2, the invention is shown as being adapted to an ordinary single throw electrical switch, such switch comprehending a base 1 of porcelain or other suitable insulating material generally indicated herein by the numeral 1, having an approved type of single pole switch 2 thereupon adapted to be operated through the medium of the usual push buttons 3. Contact terminals or posts in form of screws engaging electrically conductive plates indicated by the numerals 4 and 5 are arranged upon that side of the insulating base 1 receiving the switch proper 2 and as will be understood, one side of the main line or circuit is adapted to be connected to the contact screw 4, while the contact terminal 5 receives an electrical conductor which continues with that particular side of the circuit presented by the conductor connected to the terminal 4.

Electrically conductive contact plates 6 and 7 are secured to the opposite side portion of the insulating base 1, as shown in the Figure 1, and have conductor engaging and binding screws generally indicated by the numeral 8 turned into engagement therewith. Thus, it will be understood that a plurality of electrically inter-connected contact terminals will be provided on the insulating base 1, the various groups of such contact terminals being normally capable of having the electrical conductors of the opposite sides or polarities or of corresponding polarities of branch electrical circuits connected thereto.

Figure 4:
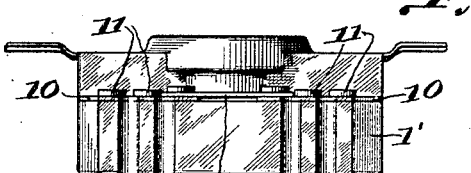
Figure 4 is a side elevation of the same.

In the Figures 3 and 4, the invention is shown used in connection with an ordinary electrical wall plug, wherein a plurality of electrically conductive contact plates 9 and 10 are secured to the face side of the insulating body 1' of the wall plug, as clearly shown in the Figure 3, and have a plurality of groups of screws generally indicated by the numeral 11 turned into engagement therewith, thus providing effective contact terminals.

Figure 5:
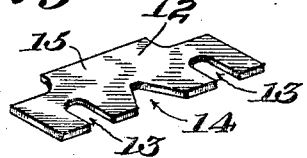
Figure 5 is a detail in perspective of one form of "jumper" or contact plate used in connection with the device.

Under certain conditions, it may be desired that a greater number of contact terminals of a corresponding polarity shall be provided upon an insulating base of my improved junction device and to accomplish this, there is provided what may be aptly termed as a "jumper" or electrical contact plate 12. such plate being formed of suitable electrically conductive material having pockets or recesses 13 formed in the opposite end portions thereof and opening onto one marginal part of the same whereby the plate may be positively connected between the several groups of contact terminals, as for illustration, the contact terminals consisting of the screws 8 arranged upon the several contact plates 6 and 7. If desired, the intermediate portion of this "jumper" 12 may be cut away, as indicated at 14 whereby the same may be practically employed in connection with the form of junction device shown in the Figure 1 in order that it will not interfere with normal usage or operation of the electrical switch, while a finger engaging extension 15 may be formed upon the opposite side of such "jumper" as shown in the Figure 5.

Again, the form of "jumper" or contact plate used in connection with the junction device may be modified in its particular form, as is shown in the Figure 3 and indicated at 16. This particular "jumper" consists of but a strip of electrically conductive material having recesses or contact terminal engaging pockets formed in the opposite end portions thereof designated by the numeral 17, such pockets being adapted to be engaged over the shank portions of the screws of the different groups of contact terminals, whereby the same will be electrically inter-connected.

In the Figures 6 and 7, I have shown several adaptions of the invention in electrical circuits, the form of usage of the invention in the Figure 6 consisting of a main circuit, the opposite conductors of which are indicated by the reference letters $a$ and $b$, the former being positive, and the latter being negative. A junction device, such as shown in the Figure 1, is connected to these conductors $a$ and $b$, the positive conductor going to the contact plate 4 of the switch element 2 and continuing on through such switch element from the contact plate. The group of contact terminals 8 connected to the contact plates 6 and 7 at the opposite sides of the base of the device are utilized at this time to serve as an electrical connection for the opposite polarities of the circuit. To this end, it will be noted that the "jumper" conductor $c$ is extended from the conductor $a$ to one of the contact terminals of the group upon the contact plate 6, thus rendering the same positive, while the conductor $b$ is extended into electrical contact with one of the group of terminals upon the plate 7, thereby rendering this latter negative.

A conductor $a'$ is extended from the contact 5, while a conductor $c'$ is extended from one of the terminals upon the plate 6 and another conductor $b'$ is electrically connected to and extended from one of the terminals on the plate 7.

A form of junction device, such as shown in the Figures 3 and 4 is next included in the circuit, the base of which is designated by the reference character 1'. As will be borne in mind this junction device has an ordinary floor or wall plug incorporated therein, while various groups of contact terminals are mounted thereupon, as shown in this embodiment, and are electrically distinct from one another, the same, in accordance with the fore-going description being identified generally by the numeral 11.

The conductor $a'$ is extended into electrical engagement with one of the contact elements of the various groups 11, while the positive conductor $c'$ is electrically connected to a contact terminal of another of these groups of terminals 11 and continues or extends from the junction device through the medium of a conductor $a^2$, one end of which is connected to an adjacent contact terminal of the same group, as is shown herein. The negative conductor $b$, aforesaid, is electrically connected to one of the contact terminals of still another of the electrically distinct groups, as shown, and is extended from the device through the medium $b^2$, one end of which is connected to an adjacent contact terminal of this same group.

Should it be desired to connect another branch circuit to this particular form of junction device, as for example, a light or group of lights, indicated for convenience herein by the reference character $d$, a positive conductor $d'$ is extended from one side of the light or lights $d$ into electrical contact with one of the terminals of that group to which the conductor $a'$, which is positive, is connected, while the opposite side of the light or lights has a conductor $d^a$ connected electrically thereto and extended into electrical engagement with one of the contacts of that particular group to which the conductors $b'$ and $b^2$ are electrically connected, it being noted in this connection, that said conductors are of the negative side of the main circuit.

Assuming that it is desired to further continue the main circuit through the medium of the conductors $a^2$ and $b^2$, the former being positive, and the latter being negative, either of the several forms of the junction device illustrated may be included therein, although for purposes of illustration, I have now shown the form of junction device illustrated in the Figures 1 and 2, the base of which is indicated by the numeral 1, as being connected to said circuit, that is, the positive conductor $a^2$ being connected to the contact plate 4 of the single throw switch 2 and being extended therefrom by way of the contact plate 5 in form of an electrical conductor $a^3$. The several groups of contact terminals upon the electrically distinct contact plates 6 and 7 are herein shown as being connected to the opposite polarities of the electrical circuit; a branch or "jumper" electrical conductor $c^a$ being extended from the conductor $a^2$ into electrical engagement with one of the terminals on the plate 6, thus rendering all of these contacts positive with respect to the circuit. The electrical conductor $b^2$, which constitutes the negative side of the electrical circuit is extended into engagement with one of the terminals of that group upon the contact plate 7. Extended from the group of contact terminals upon the plate 7 is an electrical conductor $b^3$.

There is next included in the circuit, a form of junction device as shown in the Figures 3 and 4, the base of which is herein indicated by the reference character $1'$. This particular junction device, which includes a plurality of groups of electrically distinct contact terminals, has the positive conductor $a^3$ electrically connected to one of the terminals of said groups, as is clearly shown, thus rendering such group positive in an electrical sense. It is desired that the opposite group upon the corresponding side of the base portion 1 shall be also electrically positive and to effect this, a conductor, $a^{3'}$ is extended from the plate 6 of the preceding junction 1 into electrical engagement with one of the terminals of said opposite group, while a conductor $a^4$ is electrically extended from this group. Likewise, it is also desired that one of the groups of the transversely opposite contact terminals shall be likewise rendered electrically positive and to effect this, a conductor $c^b$ is extended from one of the terminals representing the group engaged by the positive conductor $a^3$ transversely across the basal portion into electrical engagement with an adjacent terminal of the opposite group. Thus, it will be seen that three of the groups of contact terminals upon this particular junction device are rendered electrically positive. The negative conductor $b^3$ is extended into electrical engagement with one of the contact terminals of the remaining group, while suitable electrical connection is made through branch conductors with the floor or wall plug connection on said base $1'$ from certain of the positive groups of contact terminals and one of the contact terminals of the negative group. To continue the circuit from this particular junction device, the aforesaid positive electrical conductor $a^4$ is extended from one of the terminals of one of the positive groups, while a conductor $b^4$ is connected to and extended from one of the terminals of the negative group.

Should it be desired to connect a branch electrical circuit with the heretofore described junction device, the current receiving medium, herein shown to be an electric lamp $d^3$ has an electrical conductor $d^4$ extended from one side thereof into engagement with one of the contact terminals of that group to which the conductor $c^b$ is electrically connected, while another conductor $d^5$ is extended from the opposite side of the lamp into electrical engagement with one of the contact terminals of the negative group, thereby completing the branch electric circuit.

Another arrangement of the form of junction device shown in the Figures 3 and 4 may be had, and in illustration of this, it will be noted that one of these junction devices, the basal portion of which is indicated by the numeral $1'$ has one of the contact terminals of a certain group of contacts thereon electrically connected with the free end of the positive electrical conductor $a^4$, while the negative conductor $b^4$ is connected to a contact terminal of another group of such terminals. Suitable electrical conductors $e$ are extended from the positive and negative groups of contact terminals into engagement with the floor or wall plug connection of the device. The circuit may be extended from the junction device by a jumper plate 16, inserted as between the longitudinally opposite groups of contact terminals 11 upon said junction device, thus rendering all of said contact terminals along one side thereof positive as is shown, whereupon an electrical conductor $a^5$ is electrically connected to one of the terminals of the opposite group thereof, while a negative conductor $b^5$ is electrically connected to one of the terminals of the negative group, that is, the group of terminals having electrical connection with the aforesaid electrical conductor $b^4$.

Should it be desired, another of the junction devices, either of construction as shown in the Figure 1, or of construction as shown in the Figure 3, may be connected to the conductors $b^5$ and $a^5$. For purposes of illustration, I have shown that form of junction device as illustrated in the Figures 3 and 4, as being connected to said conductors $b^5$ and $a^5$, the basal portion of which is again designated by the reference numeral $1'$. In this particular adaption of the junction device, all of the longitudinally disposed contact terminals along one side of the base portion thereof are rendered electrically positive by the insertion of a jumper plate 16. Thus, branch lines or conductors $a^6$ extended from the contact terminals of these electrically interconnected groups will be electrically positive. All of the longitudinally disposed contact terminals upon the opposite side of the base portion $1'$ are rendered electrically negative by the insertion of another jumper plate 16, and by consequence, it will be understood that inasmuch as the negative electrical conductors $b^5$ is electrically connected to one of said contact terminals, all of the same will be rendered electrically negative, and thus, such branch conductors $b^6$ as may be extended therefrom will be of corresponding polarity.

In the Figure 7, I have shown still another modified form or adaption of that form of junction device as shown in the Figures 1 and 2, the base portion of such junction being indicated herein by the numeral $1'$ and having an electrical conductor $a^7$ connected to the contact plate 4 of the single throw switch 2, while an extension positive electrical conductor $a^8$ is extended from the contact plate 5. The various groups of contact terminals 8 electrically connected to the contact plates 6 and 7 on the opposite sides of the base 1 are electrically inter-connected through the medium of a jumper plate 12, the same electrically spanning such contact plates, as is clearly shown. The negative electrical conductor $b^7$ is electrically connected to the outermost contact terminal 8, and as will be understood, various other electrically negative branch conductors generally designated by the reference character $b^8$ may be electrically connected to said electrically inter-connected contact terminals 8 and extended into engagement with the negative side of the current receiving devices $d^6$ included therein, the opposite sides of such devices, of course, being electrically connected to the positive conductor $a^8$.

It is of course to be understood that various other forms or adaptions of the junction devices may be successfully and practically used in connection with electrical circuits, other than those specifically shown and described herein, such as conditions or preference may dictate, the sole objective of the invention being to provide a junction device from which the positive and negative sides of an electrical circuit can be extended without the necessity of splicing the conductors or making similar time consuming and labor expending connections.

Manifestly, the construction shown is capable of considerable modification, and such modification as is within the scope of my claims, I consider within the spirit of my invention.

I claim:

1. In combination with an electrical appliance having an insulating body, a plurality of groups of electrically inter-connected junction terminals thereupon, said groups being adapted to receive electrical conductors of different polarity, and jumper contact plates engageable with certain of the junction terminals of said groups whereby to electrically inter-connect the same for engagement with electrical conductors of corresponding polarity.

2. In combination with an insulating body, a plurality of electrical contact plates, a plurality of groups of contact terminals engaging said plates and adapted to be connected to electrical conductors of certain polarity, certain of said contact terminals of the groups of different polarity being adapted to be engaged with the electrical conductors forming the opposite sides of a main electrical circuit, and jumper contact plates adapted to temporarily inter-connect certain of said electrical contact plates, as and for the purpose set forth.

3. In combination with an electrical appliance having an insulating body, a plurality of electrical contact plates secured to one face thereof in spaced relation, a plurality of groups of junction terminals engaging said plates adapted to be connected to electrical conductors of certain polarity, certain of said junction terminals being adapted to be connected with the opposite sides of a main electrical circuit, and jumper contacts adapted to temporarily inter-connect certain of said electrical contact plates and junction terminals, as and for the purpose set forth.

In witness whereof I have hereunto set my hand.

HARRY I. SCHARR.